United States Patent [19]

Helm

[11] Patent Number: 4,665,929

[45] Date of Patent: May 19, 1987

[54] AXIAL FLOW COMBINE HARVESTER FEED PLATE

[76] Inventor: William N. Helm, 1124 Mayfair Road, Oakville, Ontario, Canada, L6M 1G8

[21] Appl. No.: 887,476

[22] Filed: Jul. 21, 1986

[51] Int. Cl.[4] .......................... A01F 12/10; A01F 7/06
[52] U.S. Cl. .............................. 130/27 T; 130/27 AB
[58] Field of Search .............. 130/27 T, 27 AB, 27 R; 56/14, 6

[56] References Cited

U.S. PATENT DOCUMENTS

| | | | |
|---|---|---|---|
| 3,994,303 | 11/1976 | Rowland-Hill | 130/27 T |
| 3,994,304 | 11/1976 | Todd et al. | 130/27 T |
| 4,209,024 | 6/1980 | Powell et al. | 130/27 T |
| 4,269,200 | 5/1981 | Gorsler | 130/27 AB |
| 4,291,709 | 9/1981 | Weber et al. | 130/27 T |
| 4,328,815 | 5/1982 | Rowland-Hill | 130/27 T |

*Primary Examiner*—Paul J. Hirsch
*Attorney, Agent, or Firm*—Robert L. Farris

[57] ABSTRACT

An axial flow combine harvester feed plate for directing crop material from a conveyor into the lower forward portion of an axial flow rotor housing. The feed plate includes surfaces that reduce the overall width of a mat of crop material entering the rotor housing and a surface that guides material upwardly and rearwardly. The surface of the feed plate that guides crop material upwardly and rearwardly directs the mat of crop material into the rotor housing hear the front of the axial flow rotor on one side of the rotor housing. On the other side of the rotor housing, crop material enters the housing some distance rearwardly from the front of the axial flow rotor. This results in a band of crop material engaging the rotor in the rotor housing.

3 Claims, 6 Drawing Figures

AXIAL FLOW COMBINE HARVESTER FEED PLATE

BACKGROUND OF THE INVENTION

The invention relates to an axial flow combine harvester and in particular to a feed plate for directing crop material into the rotor for threshing and separation.

Crop material is fed tangentially into the threshing cylinder of a conventional combine. Tangential feed is an easy and uncomplicated method of conveying crop material. Conveying crop material into the end of an axial flow rotor housing on the other hand is not an easy matter. The most significant patents to issue on axial flow combines have been concerned with conveying crop material into the housing for an axial flow rotor.

Funnels have been provided at the front of the rotor housing with screw conveyors on the forward end of the rotor and inside the funnel. Fans have been used to blow crop material into a rotor housing. Attempts have been made to suck crop material into rotor housings. Various beater configurations have been tried to force crop material into rotor housings. Screw conveyors have been suggested which would force feed crop material into a rotor housing.

All of the above-mentioned feeding methods for feeding crop material to an axial flow rotor and into a rotor housing have disadvantages. The power required to drive the feeding mechanisms is excessive in some. The quantity of material that can be fed into the threshing and separating mechanisms is limited in some. Wear on portions of the inlet end of the axial flow rotor is excessive in some.

The elevator to the cylinder on a conventional combine harvester generally houses a chain and slat conveyor or a beater conveyor. The beater conveyors have a beater immediately in front of the threshing cylinder. The chain and slat conveyors often employ a beater between the discharge end of the chain and slat conveyor and the threshing cylinders. With both types of elevators to the cylinder, the crop material is pressed into a continuous mat that is relatively thin and the width of the elevator housing. This mat of crop material tends to hold together. Under most conditions, it is easy to convey. A conventional combine cylinder receives the mat tangentially and moves it along the arcuate surface of a concave. As the mat of crop material moves along the concave, it is accelerated and the grain is threshed from the heads.

A mat of crop material moves from a standard elevator to the cylinder and enters an axial flow rotor housing in a plane that is inclined upwardly and rearwardly relative to the direction of travel of the machine. This mat of crop material contacts a threshing and separating rotor that rotates about an axis that is close to horizontal and lies in a vertical plane that extends in a fore and aft direction relative to the harvester. The center portion of the mat of crop material makes an essentially point contact with the rotor and the side portions of the mat must be cramed into the rotor housing some way. The point contact results in fast wear on the surface of the rotor. The poor feeding of the edges of the mat of crop material into the rotor casing decreases the capacity of the harvester and reduces harvester efficiency.

SUMMARY OF THE INVENTION

The axial flow combine harvester of this invention includes an improved crop material feed plate. This crop material feed plate is positioned at the entrance to the axial flow rotor housing. Crop material, that leaves the elevator to the cylinder in a thin flat mat, is guided by the crop material feed plate into the axial flow rotor housing.

The crop engaging surface of the crop material feed plate extends upwardly and rearwardly from a position adjacent the elevator to the cylinder discharge to a position where the rotor housing is joined. The upper edge of the crop material feed plate is positioned forwardly relative to the axis of the axial flow rotor on one side of the harvester and a substantial distance to the rear relative to the axis of the rotor on the other side of the harvester. The position in which the crop material feed plate joins the rotor housing moves rearwardly relative to the axis of the rotor from the one side of the harvester to the other side of the harvester. The slope of the crop material feed plate is quite steep on one side of the axial flow rotor housing. On the other side of the axial flow rotor housing, the slope of the feed plate is less steep.

The crop material plate receives a thin wide mat of crop material and tends to twist the mat so that the crop material mat contacts the axial flow rotor in a band.

DETAILED DESCRIPTION OF THE PREFERRED EMBODIMENT

Figure 1:
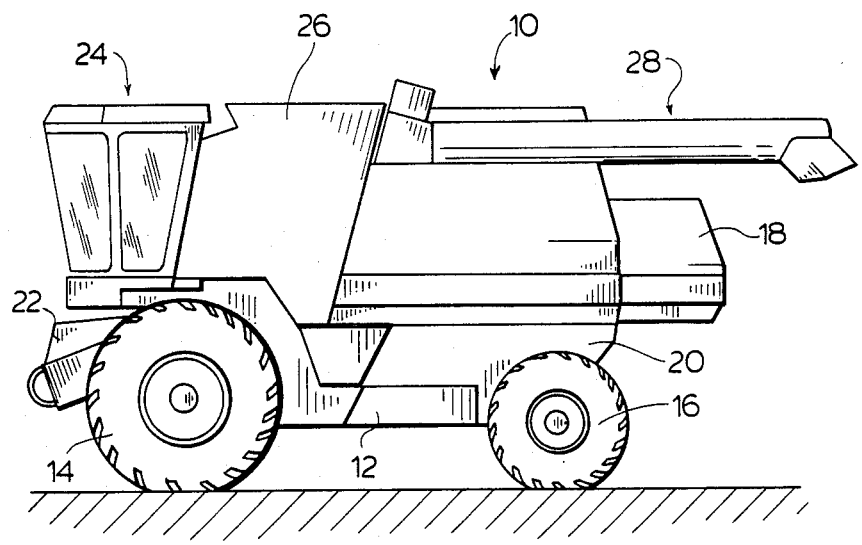
FIG. 1 is a side elevation of an axial flow combine harvester without a Table attached.
Figure 2:
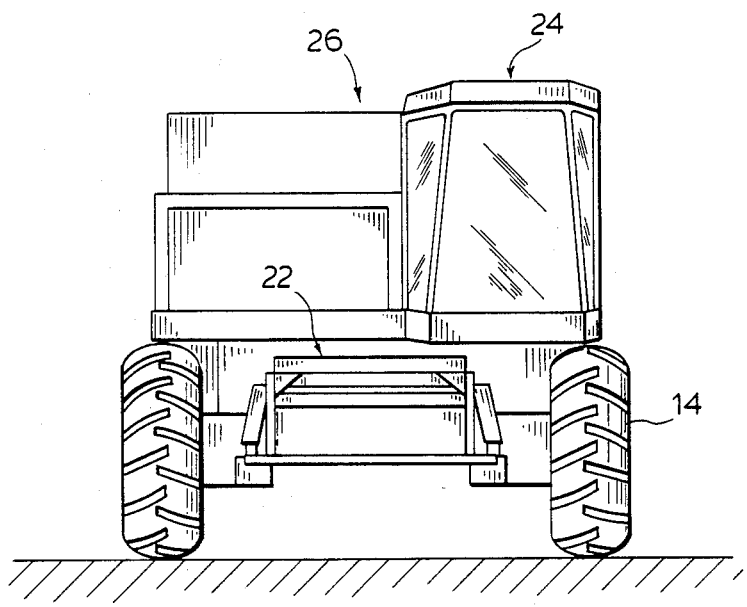
FIG. 2 is a front elevation of the axial flow combine harvester of FIG. 1.

The axial flow combine harvester 10, as shown in FIG. 1 includes a frame 12 supported on front drive wheels 14 and rear steerable wheels 16. A rotor discharge housing 18, and a cleaning system housing 20 are mounted on the rear portion of the frame 12. An elevator to the cylinder 22 is pivotally attached to the front portion of the frame 12. An operator's cab 24 is mounted on the front left hand side of the frame 12 above one of the front drive wheels 14.

A clean grain tank 26 is mounted on the frame 12 adjacent the rear wall of the operator's cab 24. A grain tank discharge conveyor assembly 28 is supported by the grain tank 26.

An engine compartment 30 is supported on the upper portion of the frame 12 and adjacent the rear wall of the grain tank 26. An internal combustion engine is housed in the engine compartment 30 for driving, harvesting, threshing, separating and cleaning assemblies and for driving the front drive wheels 14 to propel the axial flow combine harvester 10 through a field.

Figure 3:
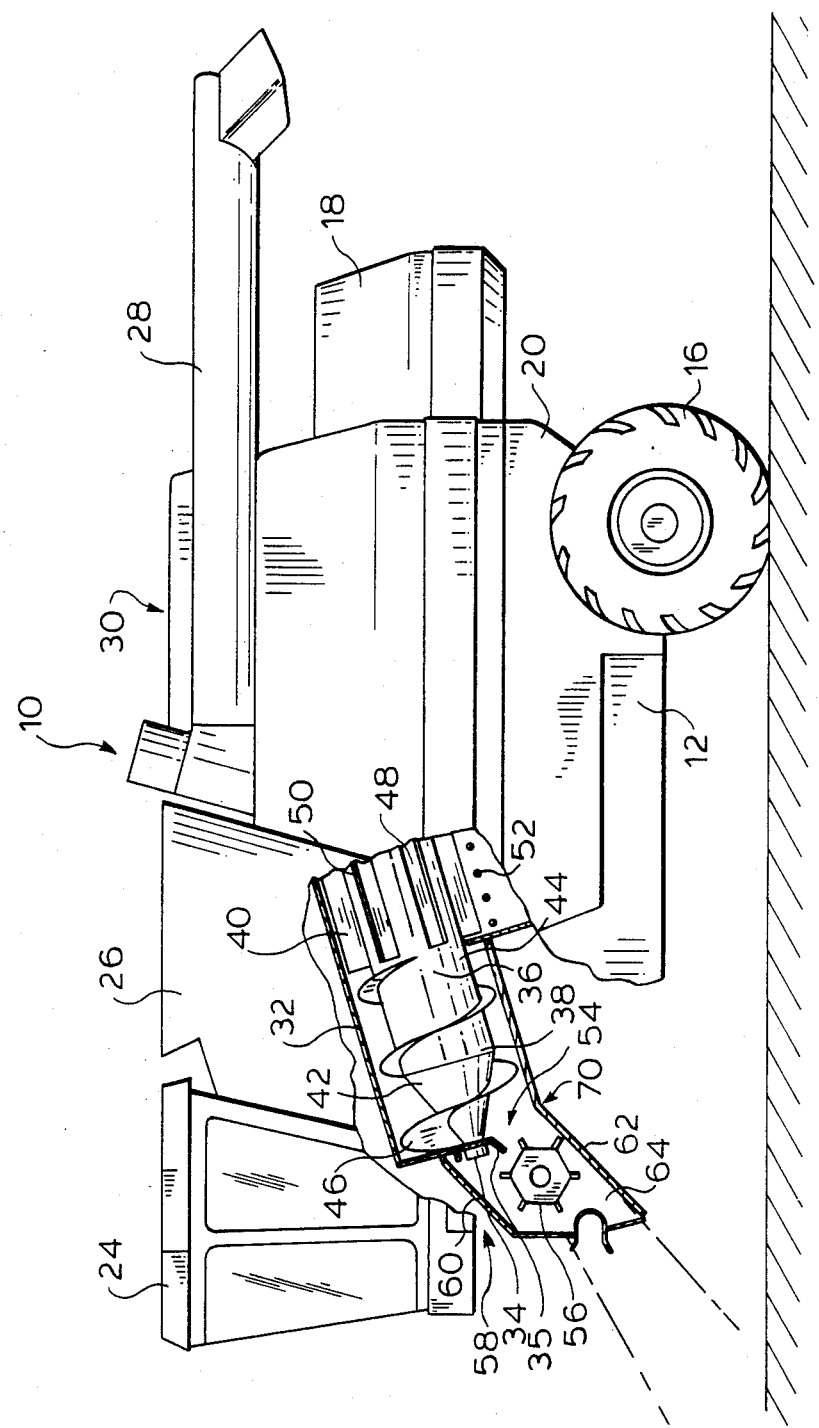
FIG. 3 is an enlarged side elevation of the axial flow combine harvester with parts broken away to show the forward portion of the threshing and separating rotor and the feed means for feeding crop material into the rotor housing.
Figure 4:
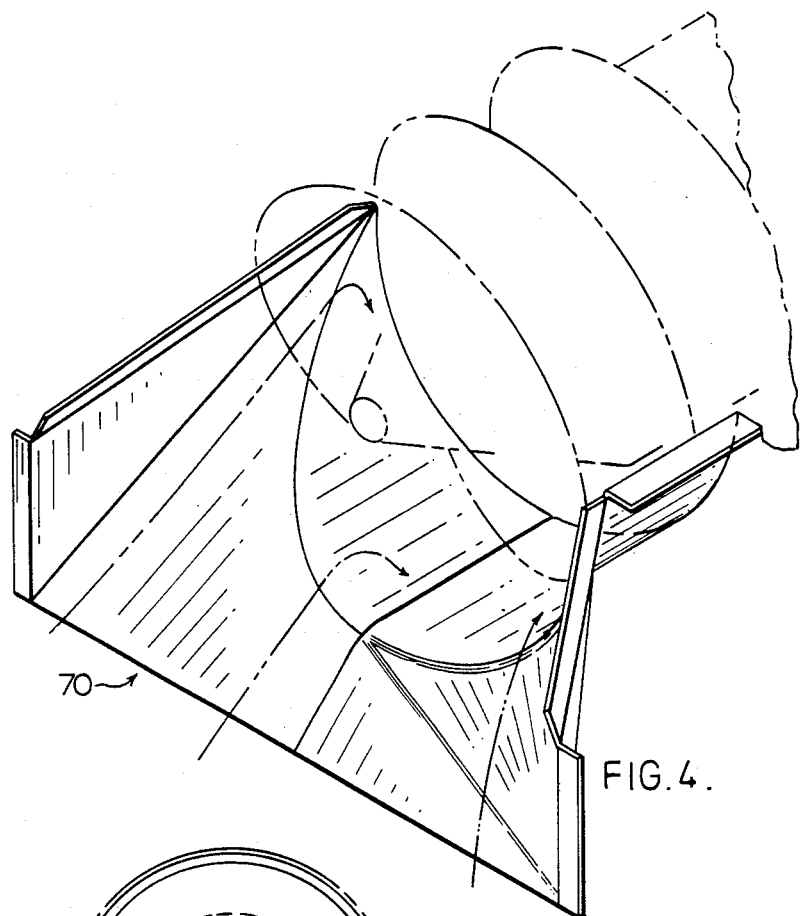
FIG. 4 is an enlarged perspective view of the feed plate, and the forward lower portion of rotor housing.

An axial flow rotor housing 32 shown in FIG. 3 is supported on the frame 12 inside the body of the axial flow combine harvester 10. An axial flow rotor 36 is rotatably supported inside the axial flow rotor housing 32 by a front bearing 34 and a rear bearing which is not shown. The front bearing 34 is supported by a front bearing support beam 35. The front bearing support beam 35 extends horizontally across the forward end of the axial flow rotor housing 32 and is rigidly secured to the frame 12.

The axial flow rotor 36 is supported by the front bearing 34 and a rear bearing for rotation about a rotor axis that extends rearwardly and slightly upwardly from the front of the combine harvester 10. An internal combustion engine in the engine compartment 30 rotates the axial flow rotor 36 about the rotor axis.

The axial flow rotor 36 has a front inlet section 38, a threshing section 40 and a rear separation section which is not shown. The front inlet section 38 includes a conical member 42, the large end of which joins a tubular member 44. Screw conveyor flighting 46 is mounted on the outer surface of the conical member 42 and the tubular member 44. The screw conveyor flighting 46 moves crop material, that enters the axial flow rotor housing 32, rearwardly to the threshing section 40. The threshing section 40 of the axial flow rotor 36 includes a continuation of the tubular member 44 and rasp bar supports 48. The rasp bar supports 48 are secured to the outer surface of the tubular member 44 and extend parallel to the axis of rotation of the axial flow rotor 36. Rasp bars 50 are bolted to the radially outer edges of the rasp bar supports 48. The rasp bars 50 cooperate with a threshing concave 52, which forms a section of the lower portion of the axial flow rotor housing 32, to thresh crop material.

Crop material enters the axial flow rotor housing 32 through an aperature 54 between the front lower portion of the axial flow rotor housing 32 and the lower edge of the front bearing support beam 35. Crop material is fed through the aperture 54 by a beater 56. The beater 56 as shown in FIG. 3 is in a fixed feed housing 58. Tne feed housing includes a top wall 60, a bottom wall 62, and two side walls 64. The beater 56 is rotatably journaled in bearings mounted on the side walls 64 of the fixed feed housing 58. The beater 56 is driven by an internal combustion engine in a counterclockwise direction as shown in FIG. 3, to feed crop material into the axial flow rotor housing 32. The elevator to the cylinder 22 is pivotally secured to the yoke members 68 integral with the side walls 64 of the fixed feed housing 58.

Various harvesting tables can be connected to the front of the elevator to the cylinder 22. U.S. Pat. No. 3,324,637 to Ashton et al shows two possible tables and a connecting structure. In operation, the table gathers crop material and conveys the crop material to the elevator to the cylinder 22. The conveying mechanisms inside the elevator to the cylinder 22 deliver the crop material to the beater 56. The beater 56 conveys crop material through the aperture 54 and into the axial flow rotor housing 32.

A feed plate 70 shown in FIGS. 3 through 6 guide crop material as it passes from the beater 56 and into the axial flow rotor housing 32. The feed plate 70 has a right hand side section 72 and a left hand side section 74 joined together in the middle along line 76. The purpose of the joint at line 76 is to facilitate assembly and replacement, if required.

The right hand side section 72 of the feed plate 70 includes a front flange 78 secured to the frame 12, an upper flange 80 secured to the top half of the axial flow rotor housing 32 and a connection to the bottom half of the axial flow rotor housing along line 82 in a plane perpendicular to the axis of rotation of the axial flow rotor 36. The left hand side section 74 of the feed plate 70 includes a front flange 84 secured to the frame 12, an upper flange 86 secured to the top half of the axial flow rotor housing 32 and a connection to the bottom half of the rotor housing along line 82 in a plane perpendicular to the axis of rotation of the axial flow rotor 36.

The feed plate 70 includes a surface 88 that is inclined rearwardly and upwardly from a bottom front edge 90 and an arcuate surface 92 that is a part of the axial flow rotor housing 32. The arcuate surface 92 is spaced substantially an equal radial distance from the axis of rotation of the axial flow rotor 36. The surface 88 joins the arcuate surface 92 along a line 94.

The bottom front edge 90 of the feed plate 70 is horizontal and perpendicular to a vertical plane through the axis of rotation of the axial flow rotor 36. The surface 88 of the feed plate 70 extends upwardly and rearwardly from the bottom front edge 90 until it joins the arcuate surface 92. On the left hand side of the feed plate 70 near the front flange 84 the slope of the surface 88 is very steep. On the right hand side of the feed plate 70 near the front flange 78 the slope of the surface 88 is substantially less steep. The slope of the surface 88 is uniform from the front edge 90 to the line 94 except on the left hand side on the harvester. The slope of the portion of the surface 88 above the line 85 increases from the line 85 to the line 94. The location of the junction between the surface 88 and arcuate surface 92 is represented by the line 94. The line 94 is near the front of the axial flow rotor 36 on the left hand side of the axial flow rotor housing 32 and is a substantial distance to the rear on the right hand side of the axial flow rotor housing 32.

Figure 5:
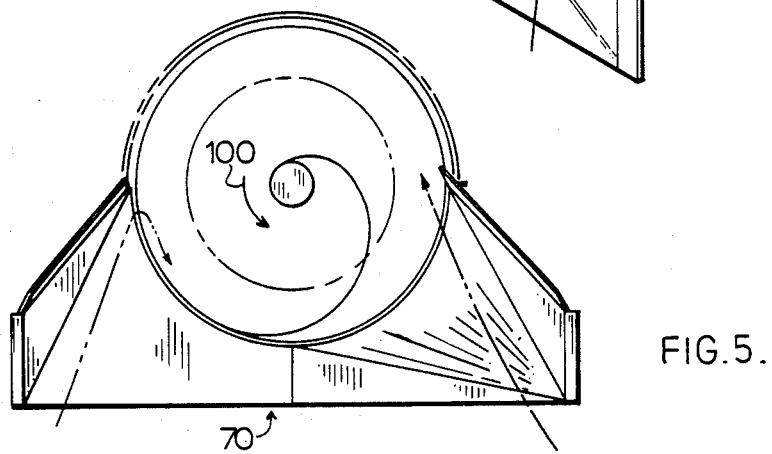
FIG. 5 is a front elevation of the feed plate and rotor housing of FIG. 4 with a reduced scale.
Figure 6:
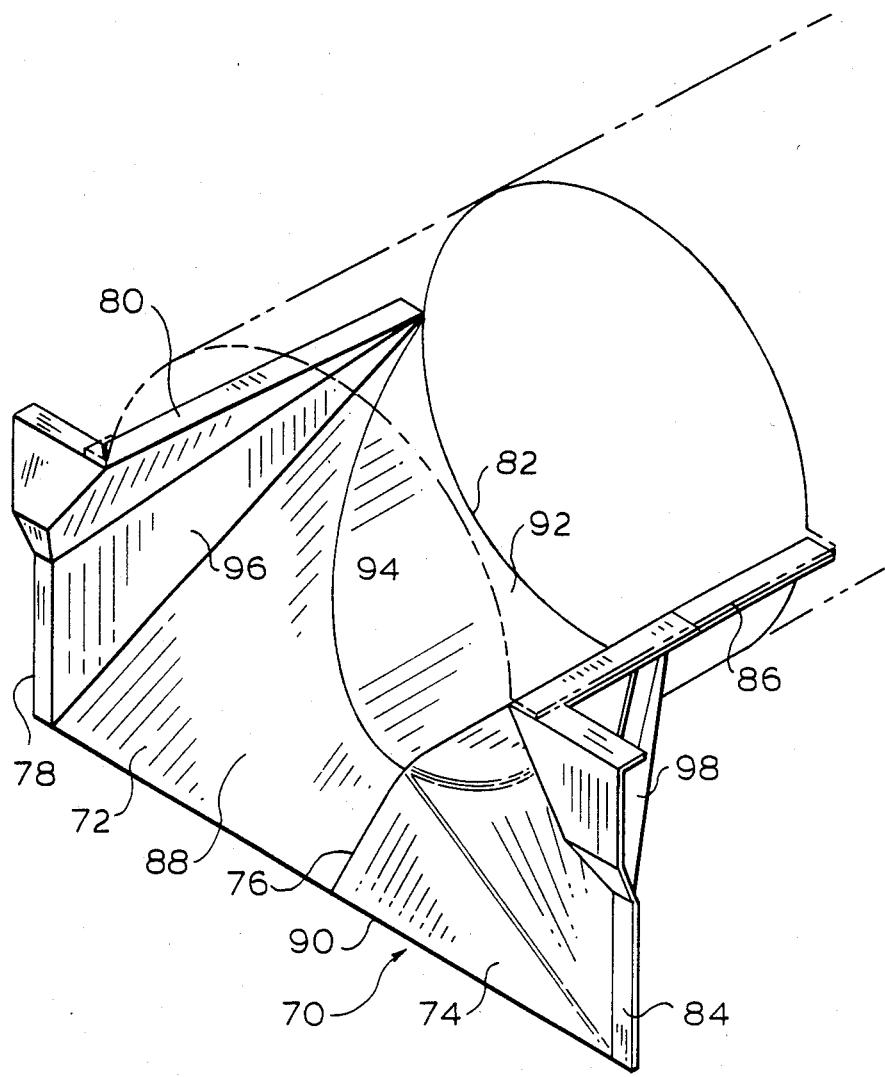
FIG. 6 is a detailed perspective view of the feed plate of FIG. 4 and its connection to the rotor housing

The bottom front edge 90 of the feed plate 70 as shown in FIG. 5 is wider than the diameter of the axial flow rotor housing 32. The feed plate 70 includes side walls 96 and 98 which move the side edges of a mat of crop material inward toward the axial flow rotor housing 32.

The axial flow rotor 36 is driven by an engine in the engine compartment 30 so that it rotates in a counterclockwise direction as viewed from the front. The direction of rotation is represented by the arrow 100 in FIG. 5.

Crop material fed into the axial flow rotor housing 32 by the beater 56 is directed upwardly and rearwardly by the surface 88 of the feed plate 70 and into contact with the screw conveyor flighting 46 on the front inlet section 38 of the axial flow rotor 36. Due to the change in the slope of the surface 88 from one side of the combine harvester to the other side, the mat of crop material tends to be twisted and enter the axial flow rotor housing 32 in a relative wide band as it follows the paths represented by the arrows 102 in the drawing.

I claim:

1. An axial flow combine harvester with a frame, an axial flow rotor housing attached to the frame, an axial flow rotor rotatably supported inside the rotor housing, an elevator to the cylinder pivotally attached to the forward portion of the frame, and a feed plate mounted on the frame between the elevator to the cylinder and the lower forward portion of the rotor housing, the feed plate including a surface that extends upwardly and rearwardly to where it joins an arcuate surface that forms the lower front portion of the axial flow rotor housing and wherein the location of the junction between the upwardly and rearwardly extending surface of the feed plate and said arcuate surface on one side of the rotor housing is substantially forward of the junction between the upwardly and rearwardly extending surface of the feed plate and said arcuate surface on the other side of the rotor housing.

2. The axial flow combine harvester of claim 1 wherein the feed plate includes surfaces which extend upwardly, from each side of the surface that extends upwardly and rearwardly, and which extend inwardly from the front to rear to decrease the width of crop material passing from the elevator to the cylinder to the rotor housing.

3. The axial flow combine harvester of claim 1 including power means to rotate the axial flow rotor in a direction that results in a given portion of the outer surface of the forward portion of the axial flow rotor moving from a position where the junction between the upwardly and rearwardly extending surface of the feed plate and the arcuate surface is at its rear extreme to a position where the junction is at its forward extreme.

* * * * *